(12) United States Patent
Caporali et al.

(10) Patent No.: US 6,290,053 B1
(45) Date of Patent: Sep. 18, 2001

(54) SMM (HALF TRAY) TRAY ORIENTATION DEVICE

(75) Inventors: Michael E. Caporali; Kenneth J. Banker, both of Owego; Louis J. Hendzel, Endicott, all of NY (US)

(73) Assignee: Lockheed Martin Corporation, Owego, NY (US)

( * ) Notice: Subject to any disclaimer, the term of this patent is extended or adjusted under 35 U.S.C. 154(b) by 0 days.

(21) Appl. No.: 09/478,904

(22) Filed: Jan. 7, 2000

(51) Int. Cl.[7] .................................................. B65G 47/24
(52) U.S. Cl. ............................................. 198/411; 198/416
(58) Field of Search .................................... 198/415, 416, 198/411

(56) References Cited

U.S. PATENT DOCUMENTS

| | | | |
|---|---|---|---|
| 3,432,023 | * 3/1969 | Lucas | 198/416 |
| 4,410,177 | 10/1983 | Richardson. | |
| 4,512,137 | 4/1985 | Koberlein. | |
| 4,741,429 | 5/1988 | Hattori et al.. | |
| 5,299,675 | 4/1994 | Schumann et al.. | |
| 5,421,714 | 6/1995 | Morikawa et al.. | |

* cited by examiner

*Primary Examiner*—Kenneth W. Noland
(74) *Attorney, Agent, or Firm*—Perkins, Smith & Cohen, LLP; Harvey Kaye; Jacob N. Erlich

(57) ABSTRACT

A conveyor for moving trays in a longitudinal direction and a position correcting device for the trays. The trays have opening in two opposite walls but do not have such openings in two other opposing walls. The conveyor is arranged to convey trays along a longitudinal path. A tray rotating arm is positioned adjacent to the conveyor and has a tray handle engaging finger and is constructed and arranged to only engage a tray handle when the tray is in an incorrect orthogonal position. There is also a bumper downstream of the arm for engaging the side of a tray so rotated for completing the tray rotation initiated by the tray rotating arm. The arm has a cam surface for being moved by a tray away from such tray on the conveyor, and the arm is biased toward contact with a tray as it moves past the arm on the conveyor. The finger projects in the same direction as the cam surface.

15 Claims, 5 Drawing Sheets

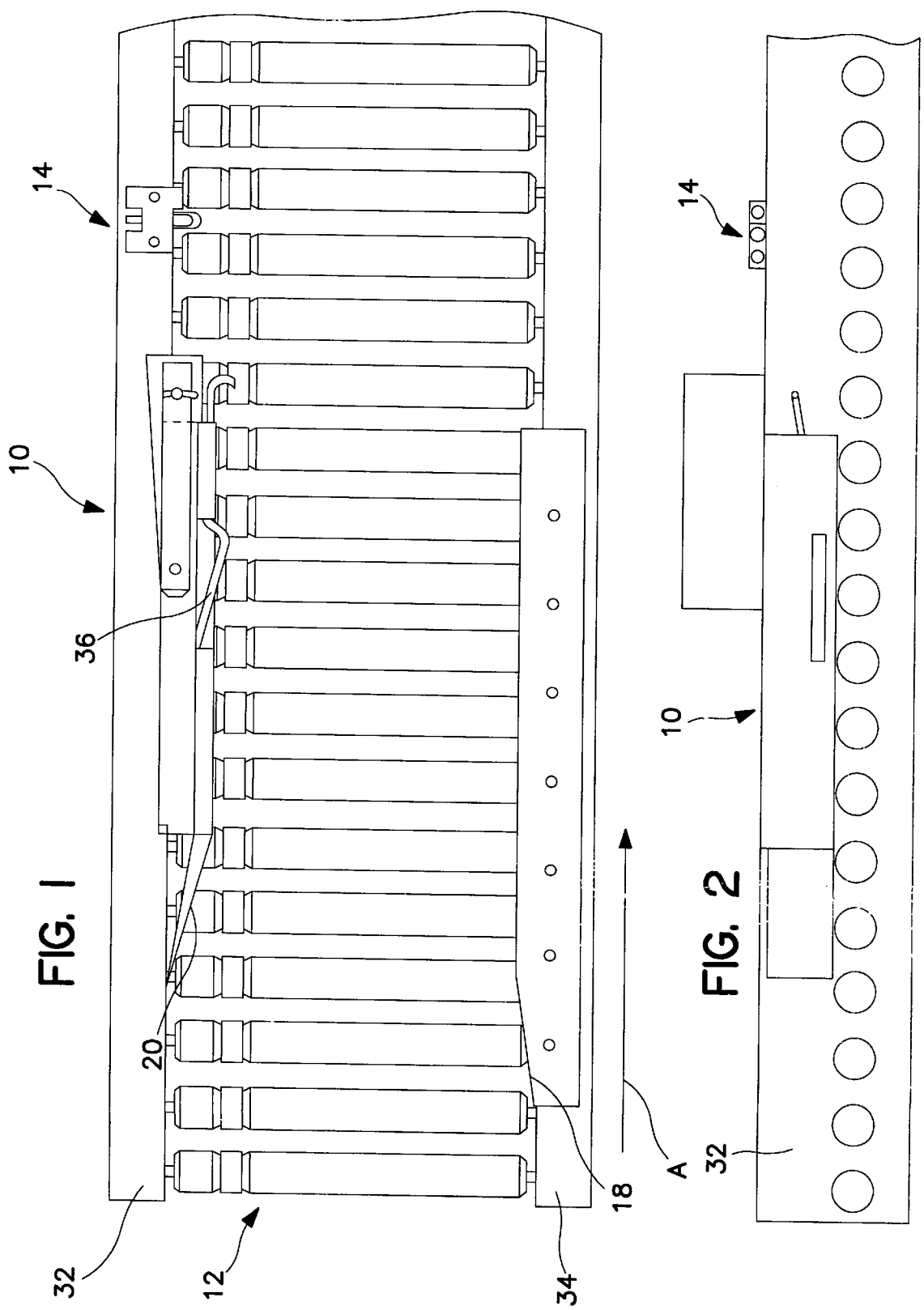

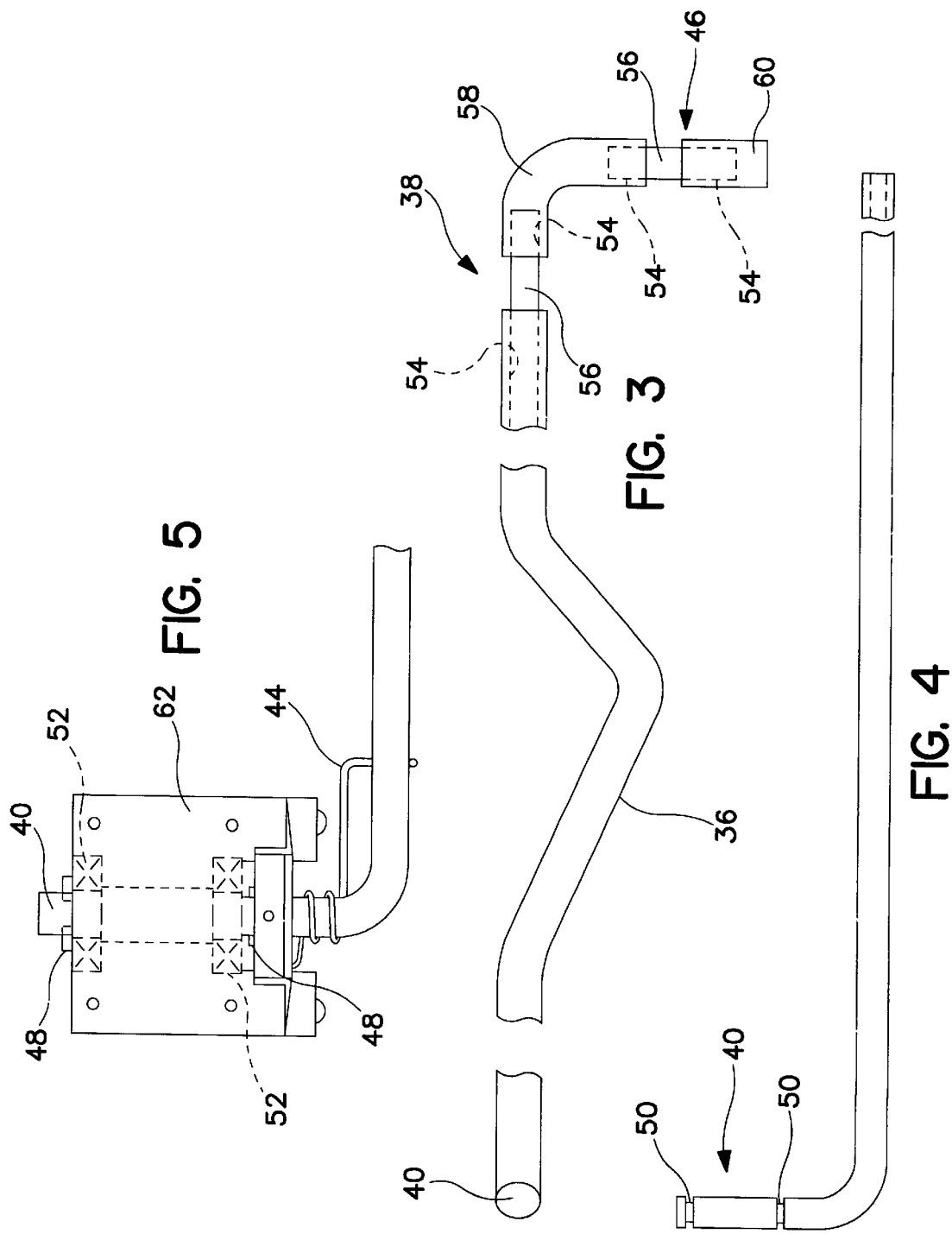

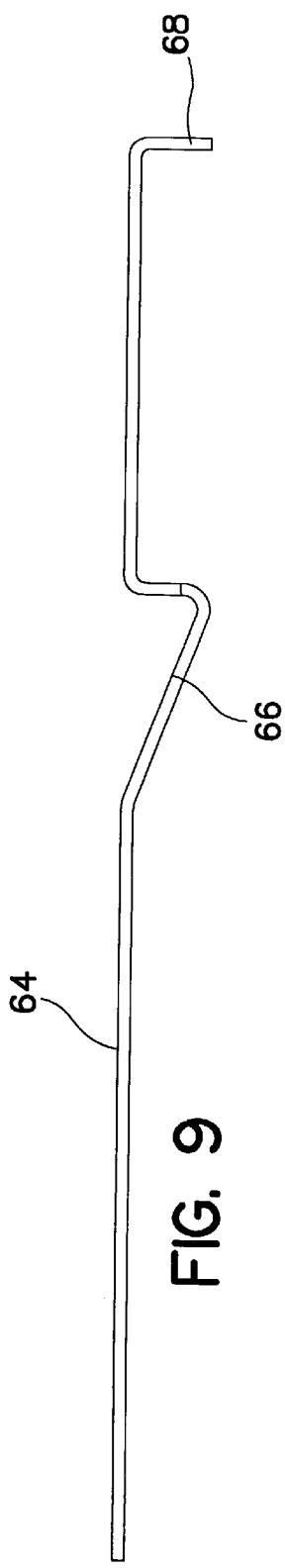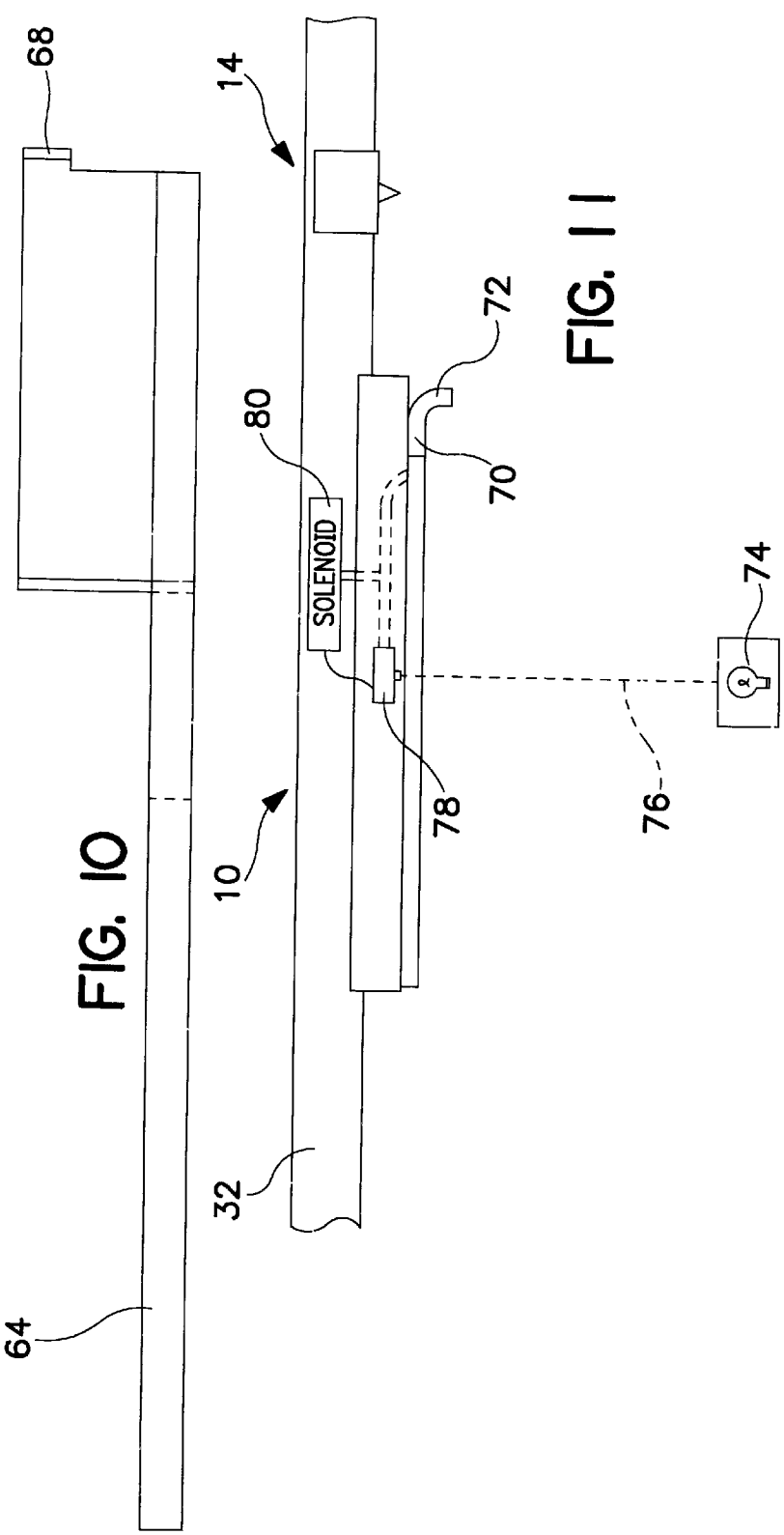

SMM (HALF TRAY) TRAY ORIENTATION DEVICE

FIELD OF THE INVENTION

The present invention relates generally to the sorting art, and, more particularly, to conveying arrangements for properly orienting articles being sorted.

BACKGROUND OF THE INVENTION

Within the U.S. Postal Service (USPS) various mail tray configurations are used in conjunction with conveyors to process the mail at a rapid pace. One of these tray types is called the "Small Managed Mail" (SMM) tray, also known as the half tray. These trays are nearly square in shape, actually they are about 14" long and 12" wide when they are made, but, since they are formed of cardboard, they become easily misshapen. They are of such a small size that it is easy for them to become mis-oriented on the conveyor which is transporting them. Frequently these are roller conveyors. When a tray is not correctly rotated it is not possible for automated equipment to properly read bar code labels, or otherwise properly handle these trays. The trays need to be oriented such that the labels are facing forwards or backwards so that they can be read by automated reading equipment.

A mail and package delivery service such as the USPS typically handles millions of items each year. Package handling requires some automation, such as using machine vision, or readers, to read addresses, a necessity in order to deliver all the items to their proper destinations.

In the past there has been no simple, effective way to rotate these trays into the correct orientation, while at the same time insuring that the trays which are already correctly oriented are not rotated into the incorrect orientation.

U.S. Pat. No. 4,512,137 discloses an orienting device for loaves of bread in which the loaves are cut in half and rotated 180 degrees so all loaves on the conveyor are oriented the same. All incoming product is acted on in the same manner.

U.S. Pat. No. 5,421,714 discloses a device for bread dough pieces which, regardless of orientation, centers them on a conveyor and bends them over on themselves prior to baking. No decision is made as to the orientation of the product and all product is acted on in the same manner.

U.S. Pat. No. 4,410,177 deals with bowling pin orientation on a conveyor system. The device is intended to orient on a single axial orientation bowling pins of the type having a relatively heavy base portion and a relatively light neck portion.

U.S. Pat. No. 4,741,429 describes a centering device for irregular ceramic articles on a conveyor line. This device is intended to center the object on the conveyor and is not intended to orient the object to a proper alignment. The device uses two sets of clamps to center the object within the device and then allows the object to be transported along the conveyor. All objects are acted on in the same manner, with the final result being an object "centered" on the conveyor, but not "oriented" on the conveyor.

U.S. Pat. No. 5,299,675 describes a large disc (>5 feet in diameter) which uses centrifugal force to force objects to the outer rim of the disc for purposes of separation and alignment. All objects which enter the device are acted on in the same manner regardless of orientation prior to entering the device. This device will not work with objects which are nearly square in shape, since it depends on the difference in width versus length to accomplish the alignment.

SUMMARY OF THE INVENTION

It is an object of the present invention to provide a simple, inexpensive device which will correctly orient half trays that are incorrectly oriented, while at the same time leave correctly oriented half trays alone.

It is another object of the present invention to provide such a device which does not hinder the passage of any other type of mail tray on the conveyor.

A further object of the present invention is to locate incorrectly oriented half trays and rotate only those trays which are not in proper orientation.

These and other objects are accomplished by using ramps and bumpers to properly position trays on the conveyor prior to the tray rotator. The half tray rotator takes advantage of the tray handle, a unique feature of the tray itself, to begin the rotation of improperly oriented half trays. This initial rotation insures interference with a secondary bumper which completes the rotation of 90 degrees, to the proper orientation. Trays which are correctly oriented prior to entering the device will simply pass through unhindered.

The actual device which initiates the rotation is a spring loaded arm with a finger capable of grabbing the handle on the tray. As a tray passes by it depresses the arm, and moves the finger out of the way, when the tray has passed the finger protrudes out, if a tray is mis-rotated the finger sticks into the hand hold of the tray causing the rotation to begin. If the tray is correctly oriented already, the finger can not grasp the hand hold, and the tray passes by.

The present invention uniquely identifies SMM which are incorrectly oriented and rotates them to proper orientation. All other tray types, including full size letter trays, flats tubs, and correctly oriented SMM trays pass through the device unaffected.

The difficulty with the SMM tray orientation problem is that by design the trays are nearly square in shape. (Theoretically they are 12 inches by 14 inches, however in practical application, after they have been used they are very nearly square). The present invention acts by identifying the one feature of a half tray that is rotated incorrectly, that being the hand hole on the side of the tray. If a tray is incorrectly oriented the invention device hooks the hand hold and rotates the tray. It is a very common problem that half trays rotate incorrectly on conveyor line, either within the USPS processing centers, or in other mailing facilities.

BRIEF DESCRIPTION OF THE DRAWINGS

FIG. 1 is a diagrammatic plan view of the present invention being used in a roller conveyor environment.

FIG. 2 is a diagrammatic side view of the arrangement shown in FIG. 1.

FIG. 3 is plan view of the tray rotator of the present invention.

FIG. 4 is a side view of the tray rotator of the present invention.

FIG. 5 is a side view of the mounting arrangement for the tray rotator.

FIG. 9 is a plan view of another embodiment of the arm.

FIG. 10 is a side view of the arm of FIG. 9.

FIG. 11 is a partial view of the conveyor showing an embodiment using an electronic system in lieu of the arm cam surface.

DETAILED DESCRIPTION OF THE PREFERRED EMBODIMENTS

Figure 7:
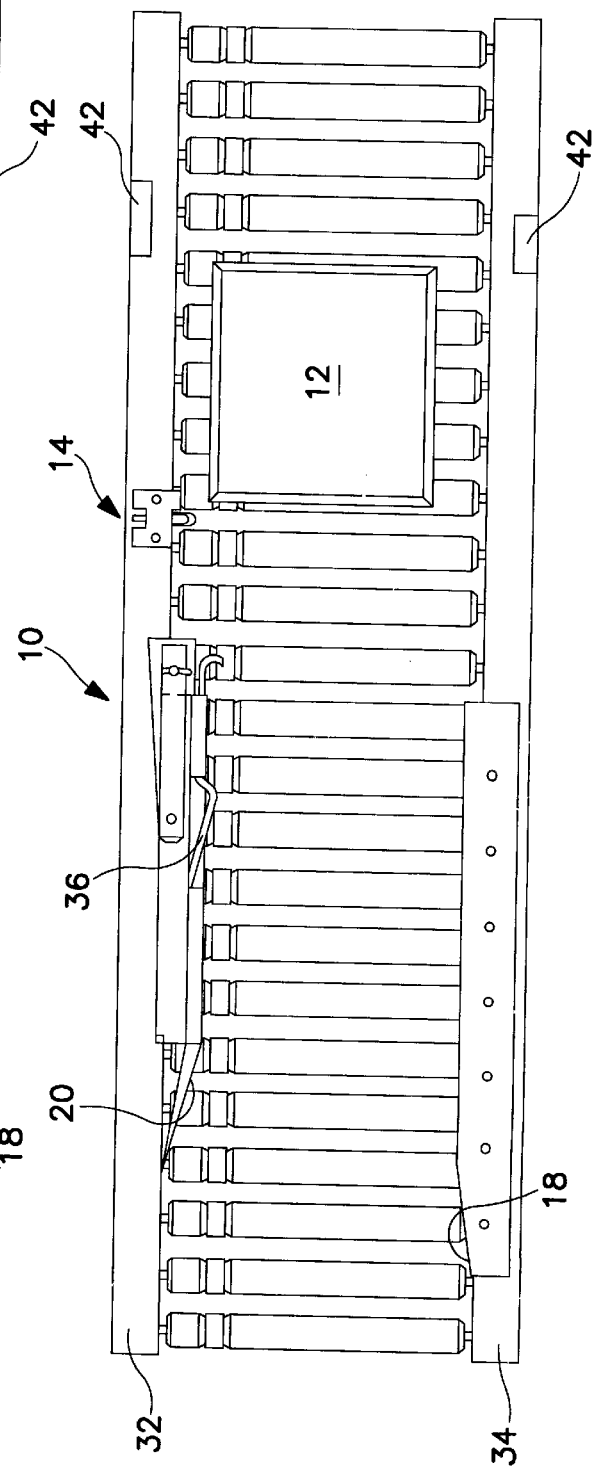
FIG. 7 is a diagrammatic view similar to FIG. 6 showing the half tray after it has completed its 90 degree rotation.
Figure 8:
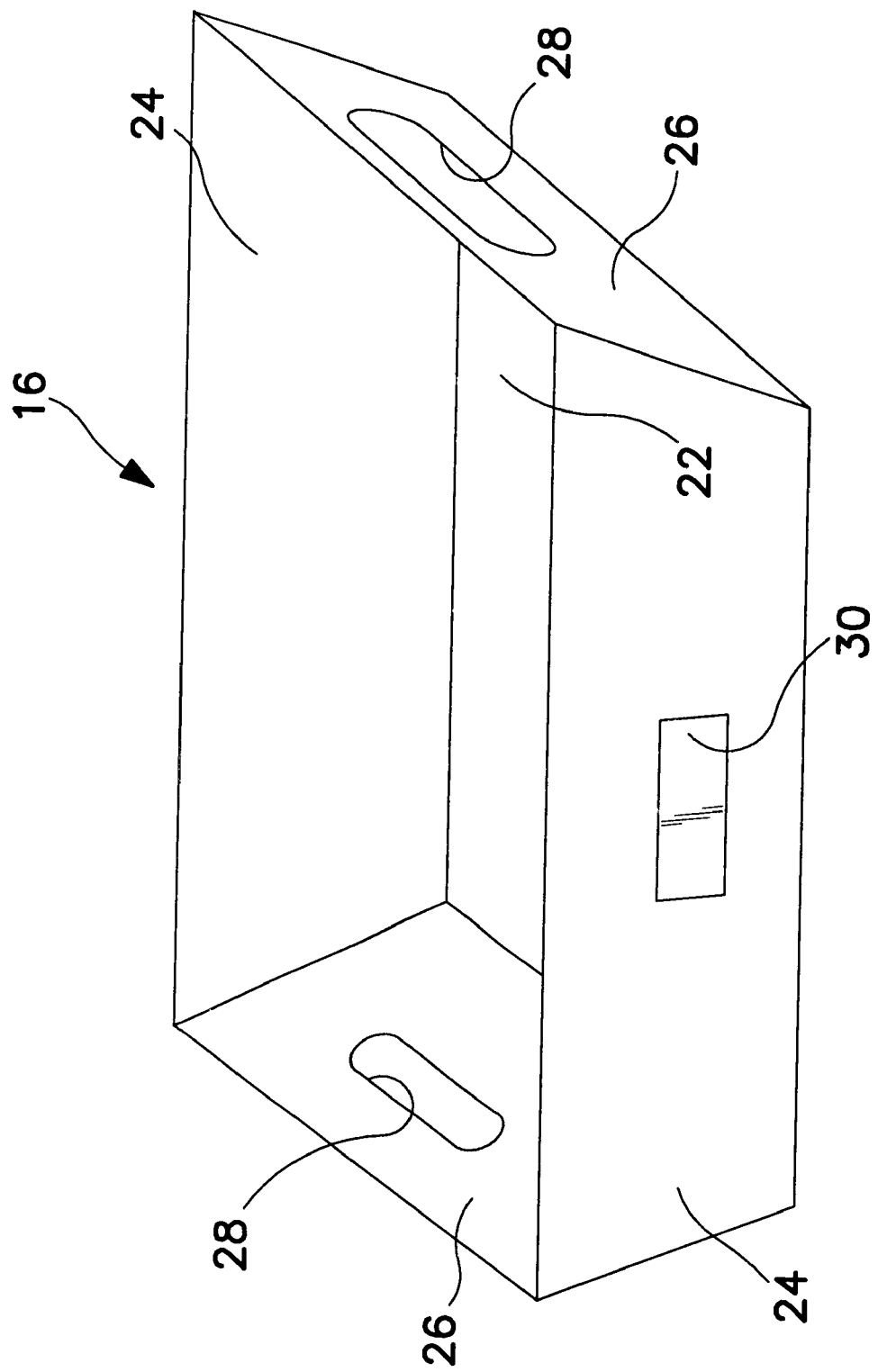
FIG. 8 is an isometric view of a half tray.

FIG. 1 shows a section of a roller conveyor 12, along which the half tray moves from left to right as indicated by the arrow A. The tray rotator 10 is mounted along one side 32 of the conveyor 12 for initiating rotation of incorrectly positioned half trays. A secondary bumper 14 downstream of the tray rotator 10 completes the rotation of a typical half tray 16 (shown in FIG. 8 and on the conveyor 12 in FIGS. 6 and 7) in a manner which is described below.

There is a ramp 18 on side 34 of conveyor 12 and a preliminary bumper 20 on side 32 of the conveyor, which are used to properly position the trays 16 trays on the conveyor 12 prior to reaching the position of the tray rotator 10. The preliminary bumper conforms to the shape of the tray and therefore is angled from the bottom to the top towards the side of the conveyor.

Half tray 16 is a typical mail carrier device which is used in many facilities of the U.S. Postal Service. The tray 16 has a bottom 22 which is 12 inches by 14 inches originally. It has an inclined front wall 24 and an inclined back wall 24, both of which are 14 inches and on which there is readable indicia (readable by humans and/or machines) providing information about the destination of the tray. There are also inclined side walls 26 both of which are 12 inches and which have handles 28 formed by cut-out portions in each side wall. Typically the front and back walls 24 are slightly wider than the side walls 26. The readable indicia is placed onto a label 30 which is then attached to the front and/or back walls 24 of the tray. The numeral "12" shown on the tray in certain figures is to indicate the shorter side of the tray.

The present invention takes advantage of this construction where the tray handles 28 are unique to the sides of the tray, the front and back walls not having such handles. The tray rotator 10 is used in combination with the handles 28, to begin the rotation of improperly oriented half trays. The trays are to be oriented so that the front and back walls thereof are parallel to the longitudinal direction of the conveyor. The reason is to provide the indicia readers 42, which are used to ascertain the intended destination of the trays with properly oriented indicia. Proper orientation means that the indicia, which is usually printed on labels 30 placed on the front and/or back walls 24 of tray 16, face the readers 42, which are located along both sides 32 and 34 of conveyor 12.

As a tray 16 moves toward the tray rotator 10, a portion of it first encounters ramp 18 on side 34 of conveyor 12 which tends to move tray 16 toward the opposite side 32 of the conveyor 12. On the opposite side 32 and slight downstream is a preliminary bumper 20 which tends to move the tray 16 slight away from side 32. The tray 16 then travels along the side surface of tray rotator 10 until the front of it engages a cam surface 36 of a rotator arm 38 which will now be described (FIGS. 3–5).

The rotator arm has a cam surface 36 which faces the oncoming tray 16 as it moves along the conveyor 12. The arm 38 has a vertical axle 40 which is mounted for rotation to provide a rotating movement to the arm toward and away from conveyor side 32. A bearing and mounting device 62 holds the axle 40, and arm 38, in place while permitting some rotating movement. A spring 44 biases the arm toward conveyor side 34 so that cam surface 36 normally projects outwardly of tray rotator housing and extends into the path of the trays moving down the conveyor 12 as shown in FIG. 1. In this manner, every tray or other container which moves past the tray rotator 10 moves against the cam surface 36 and moves the arm 38 against the spring force away from the tray. As soon as the trailing edge of the tray (on the side which contacts the cam surface 36) passes the end of the cam surface, the arm 38 which is biased is allowed to move toward, but not quite into, its normal position (when there is no tray present as shown in FIG. 1). The arm 38 is prevented from moving into its normal position by the end of its finger 46 contacting the wall of the tray, the tray moving past the finger 46 so that there is sliding movement between them.

Figure 6:
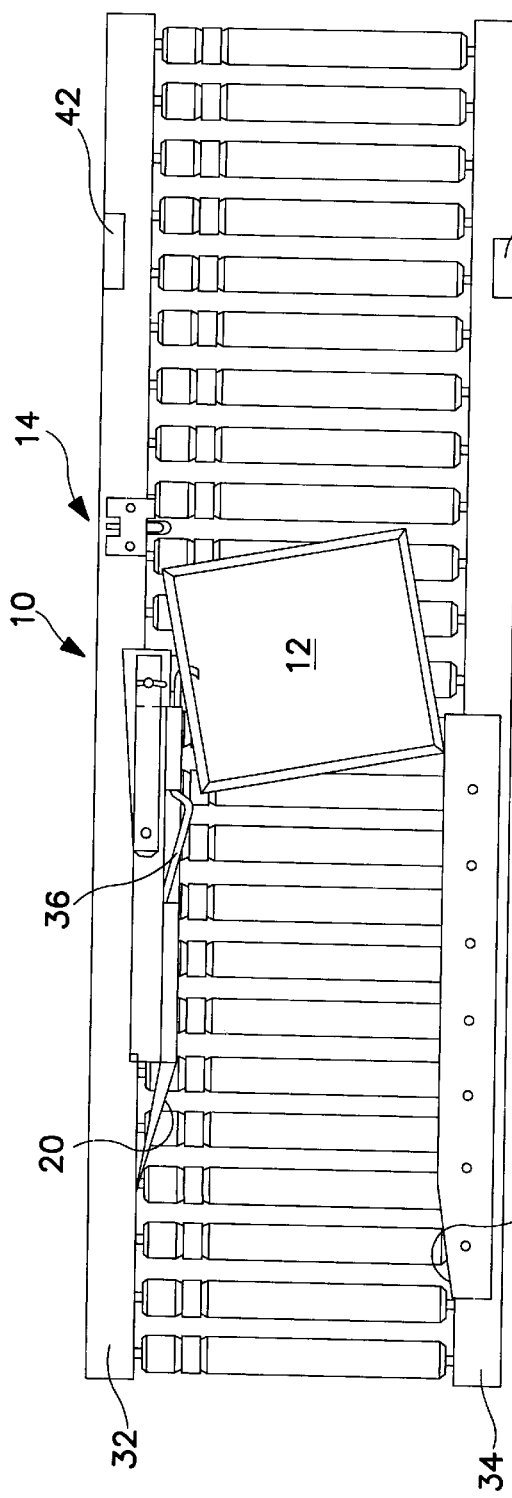
FIG. 6 is a diagrammatic view similar to FIG. 1 showing a half tray being initiated into rotation by the present invention.

In the event a front or back wall 24 is engaged by the finger 46, the sliding movement continues until the tray has moved past the tray rotator 10 and the arm 38 then moves into its normal position by spring action. However, if it is one of the side walls 26 which is contacting the finger 46, when the end of the handle 28 reaches the finger, the finger is spring biased to move into the opening of the handle (which is slot-shaped) until the other end of the handle reaches the finger 46. At this point, due to the longitudinal movement of the tray 16 along the conveyor 12, the end of the handle 28 is momentarily stopped while the remainder of the tray continues moving and the tray begins a rotating movement as shown in FIG. 6. This rotating movement releases the finger 46 from the handle 28, and a corner of the tray engages secondary bumper 14 which assists in completing the 90 degree rotation so that the tray has been rotated into the position shown in FIG. 7 in which the front and back walls 24 are parallel to the sides 32, 34 of the conveyor 12 so that the readers 42 can scan the label 30 on one or both of these walls.

This initial rotation insures tray interference with secondary bumper 14 which completes the rotation of 90 degrees, to the proper orientation. Trays which are correctly oriented prior to entering the device will simply pass through unhindered.

The arm is mounted by its axle 40 which is supported by two spaced bearings 52 in mounting device 62 which is fixed to side 32 of the conveyor 12. Axle 40 has two spaced grooves which are surrounded and rotatably supported by the bearings and there are snap rings 48 which hold these parts together. The end of the part of the arm on which the cam surface 36 is located has a threaded bore 54 into which a threaded pin 56 is threaded. An elbow is threaded onto this pin. Finger element 60 has a threaded bore 54 and a threaded pin 56 is threaded connected thereto.

In operation the tray 16 moves along conveyor 12 in the direction of arrow A. The rotation of the tray is initiated by spring loaded arm 38 with its finger 46 capable of engaging the handle 28 on the tray 16. As a tray 16 passes by it depresses the arm 38 due to contact with cam surface 36, and moves the finger 46 out of the way. When the tray 16 has passed the cam surface 36 the finger 46 protrudes out, and if a tray is mis-rotated the finger sticks into the hand hold 28 of the tray causing the rotation to begin. The rotation is completed due to contact with bumper 16. If the tray is correctly oriented already, the finger 46 can not grasp the hand hold 28, since the hand hold is not on the side facing the arm and finger and the tray passes by.

FIGS. 9 and 10 show another embodiment of the arm which does not use a spring for biasing the arm as does the first embodiment. The biasing of the arm can take another form, in this case the arm is made of sheet metal and has some natural resiliency. This feature of the sheet metal is used to provide the biasing action. The arm 64 in this embodiment is made of sheet metal. It also has a cam surface 66 and a finger 68 for moving the trays by catching the hand hold. The end opposite the finger is fixed in place and as the tray moves from left to right down the conveyor, it contacts cam surface 66 and moves the finger out of its normal position so the tray can pass. As the trailing end of the tray passes the cam surface 66 the finger is biased into contact with the tray. As long as the tray is solid, it keeps moving. However, should the hand hold be facing the finger 68, this finger will enter the hand hold and begin turning the tray as described above.

FIG. 11 shows part of the conveyor and an embodiment using an electronic system in lieu of the arm cam surface. There is an arm 70 having finger 72 at its end. A light 74 provide a constant light beam 76 across the conveyor which is detected by photo cell 78. When the beam is broken the electronics activates solenoid 80 which moves the arm away from the conveyor so that the tray can begin moving past the finger 72. When the trailing end of the tray moves sufficiently the light beam 76 is no longer broken and the solenoid 80 ceases to act and the arm 70 and finger 72 are allowed to move back toward their normal position. At this time the finger 72 contacts the tray, and, if a hand hold is facing the finger, the finger enters it and begins the turning movement described above.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A position correcting device for trays in a mail system, comprising:
    a tray rotating arm positioned adjacent to a tray conveyor having tray handle engaging means thereon which only engages a tray handle when the tray is in an incorrect orthogonal position; and
    a bumper (cam) downstream of said arm for engaging the corner of a tray so rotated for completing the tray rotation initiated by said tray rotating arm.

2. A device as defined in claim 1 wherein said arm has a cam surface for being moved by a tray away from such tray on the conveyor, said arm being biased toward contact with a tray as it moves past the arm on the conveyor.

3. A position correcting device as defined in claim 2 wherein said tray handle engaging means is a finger projecting in the same direction is the cam surface.

4. A position correcting device as defined in claim 3 wherein said arm is mounted for pivotal movement about a vertical axis.

5. A position correcting device as defined in claim 3 further comprising at least one ramp upstream of said arm for guiding a tray into proper position to be engaged by said tray rotating arm.

6. In a conveyor for moving trays in a longitudinal direction and a position correcting device for trays, the trays having openings in two opposite walls and not having such openings in two other opposing walls, the improvement comprising:
    a conveyor arranged to convey trays along a longitudinal path;
    a tray rotating arm positioned adjacent to said conveyor and constructed and arranged to only engage a tray handle when the tray is in an incorrect orthogonal position;
    tray sensing means for moving said arm away from a tray on the conveyor;
    means for biasing said arm toward the conveyor; and
    a bumper downstream of said arm for engaging the side of a tray so rotated for completing the tray rotation initiated by said tray rotating arm.

7. The improvement as defined in claim 6 wherein said tray sensing means is a cam surface on said arm for being moved by a tray away from such tray on the conveyor, said biasing means tending to move the arm toward contact with a tray as it moves past the arm on the conveyor.

8. The improvement as defined in claim 7 wherein said tray handle engaging means is a finger projecting in the same direction is the cam surface.

9. The improvement as defined in claim 8 wherein said arm is mounted for pivotal movement about a vertical axis.

10. The improvement as defined in claim 9 further comprising at least one ramp upstream of said arm for guiding a tray into proper position to be engaged by said tray rotating arm.

11. The improvement as defined in claim 10 wherein said there is a second ramp downstream of said one ramp and on the opposite side of the conveyor therefrom.

12. The improvement as defined in claim 8 wherein said biasing means is constituted by said arm being made of sheet metal and being mounted to provide the biasing action.

13. The improvement as defined in claim 8 wherein said biasing means is a spring tending to move said arm toward the conveyor.

14. The improvement as defined in claim 8 wherein said tray sensing means is an electronic assembly.

15. The improvement as defined in claim 14 wherein said electronic assembly includes means for creating a light beam across said conveyor, and a solenoid connected to move said arm away from the conveyor when the light beam is broken.

* * * * *